United States Patent
Gibbs et al.

(10) Patent No.: US 7,685,232 B2
(45) Date of Patent: Mar. 23, 2010

(54) METHOD FOR ANONYMOUS COLLABORATIVE FILTERING USING MATRIX FACTORIZATION

(75) Inventors: Simon J. Gibbs, San Jose, CA (US); Bottyán Németh, Budapest (HU)

(73) Assignee: Samsung Electronics Co., Ltd., Suwon (KR)

( * ) Notice: Subject to any disclaimer, the term of this patent is extended or adjusted under 35 U.S.C. 154(b) by 153 days.

(21) Appl. No.: 12/133,304

(22) Filed: Jun. 4, 2008

(65) Prior Publication Data

US 2009/0307296 A1    Dec. 10, 2009

(51) Int. Cl.
G06F 15/16 (2006.01)

(52) U.S. Cl. .................. 709/203; 709/201; 709/202

(58) Field of Classification Search .......... 709/201–203
See application file for complete search history.

(56) References Cited

U.S. PATENT DOCUMENTS

| 5,583,763 | A | * | 12/1996 | Atcheson et al. | ................ | 707/3 |
| 5,749,081 | A | * | 5/1998 | Whiteis | ................ | 707/102 |
| 6,041,311 | A | * | 3/2000 | Chislenko et al. | ................ | 705/27 |
| 6,092,049 | A | * | 7/2000 | Chislenko et al. | ................ | 705/10 |
| 6,671,715 | B1 | * | 12/2003 | Langseth et al. | ................ | 709/203 |
| 7,013,285 | B1 | * | 3/2006 | Rebane | ................ | 705/10 |
| 7,013,325 | B1 | * | 3/2006 | Vivian et al. | ................ | 709/203 |
| 7,475,027 | B2 | * | 1/2009 | Brand | ................ | 705/26 |
| 2002/0161664 | A1 | * | 10/2002 | Shaya et al. | ................ | 705/26 |
| 2003/0217121 | A1 | * | 11/2003 | Willis | ................ | 709/219 |
| 2004/0003097 | A1 | * | 1/2004 | Willis et al. | ................ | 709/228 |

OTHER PUBLICATIONS

U.S. Appl. No. 12/120,217, filed May 13, 2008.

* cited by examiner

*Primary Examiner*—Patrice Winder
*Assistant Examiner*—Thomas Duong
(74) *Attorney, Agent, or Firm*—Beyer Law Group LLP

(57) ABSTRACT

System and method for performing Collaborative Filtering while preserving complete user anonymity are provided. Each of a group of client devices sends a rating vector anonymously to a server. The cells in each rating vector correspond to a set of items, and selected cells have ratings provided by the user associated with the corresponding client device for the corresponding items. The server aggregates all the rating vectors into a rating matrix, and factorizes the rating matrix into a user feature matrix and an item feature matrix through approximation, such that the rating matrix equals the product of the user feature matrix and the item feature matrix. The item feature matrix is sent to the client devices. Each of the client devices calculates its own user feature vector based on its rating vector and the item feature matrix, and provides personalized recommendations on selected items based on the client's user feature vector and the item feature matrix.

39 Claims, 6 Drawing Sheets

METHOD FOR ANONYMOUS COLLABORATIVE FILTERING USING MATRIX FACTORIZATION

FIELD OF THE INVENTION

The present invention generally relates to systems and methods for using Collaborative Filtering to make personalized recommendations of items, such as media content or products, while preserving complete user or customer privacy. More specifically, the present invention relates to systems and methods for making recommendations of items personally tailored to individual anonymous users using Collaborative Filtering that employs matrix factorization.

BACKGROUND OF THE INVENTION

Presently, there is a vast amount of media content, such as audios, videos, or graphics, available from a variety of sources. From digital graphics and music to films or movies to broadcast television programs to cable or satellite television programs to home movies or user-created video clips to personal photographs, there are many repositories and databases from which people may choose and obtain media content in various formats, and the amount of media content available continues to grow at a very high rate. Broadcast, cable, or satellite companies often provide hundreds of different channels for viewers to choose from. Movie rental companies such as Netflix and Blockbuster offer tens, even hundreds, of thousands of titles on DVDs (digital video disc) or video cassettes. More recently, the Internet has also lent its unique capability and become a great repository and distribution channel for video media world-wide. Online stores such as Amazon.com have a great number of CDs, DVDs, and downloadable media files for sale. Websites such as YouTube and AOL Video have immense audio and video collections, often millions of audio/video clips, contributed by users from all over the world. Websites such as Flickr™ or webshorts enable users to upload their digital images, such as personal photos, to the Internet so that they may be shared among families and friends or with the public. The Internet also broadens the horizon for many other types of businesses. By conducting transactions online, businesses are able to sell to customers all over the world. At the same time, businesses are able to offer much greater variety of products, since they are no longer restricted by the spaces available in their physical stores.

With such a great amount of available products and media content, businesses, especially online businesses, often wish to recommend their products and media content to users or prospective customers, because these businesses typically offer very large numbers of products at their websites and consequently, it is unlikely for individual users or customers to browse through all available products personally. For example, a registered user at Amazon.com, after logging in, generally receives recommendations for various types of products, such as books, CDs, DVDs, consumer electronic items, etc., based on his or her purchasing and/or browsing history. Similarly, a registered user at Netflix.com, after logging in, generally receives movie recommendations based on his or her rental and/or viewing history.

Businesses usually try to make such product recommendations personally tailored to individual users or customers as much as possible, since what may be interesting to one customer may not be interesting to another customer. In order to make personalized product recommendations, it is necessary to collect various types of information concerning the individual users or customers in order to determine what a particular user may like or dislike. There are many different means to collect user information. For example, websites often require a user to register, i.e., creating an account with a login name and a password, before he or she can receive personalized recommendations. In addition, registered users are required to allow the websites to set cookies in their browsers so that the websites may collect information about the users.

One widely employed technique for making personalized product recommendations is Collaborative Filtering. Collaborative Filtering is the process of filtering for information or patterns using techniques involving collaboration among multiple agents, viewpoints, data sources, etc. In the case of applying Collaborative Filtering to making personalized product recommendations, the collaboration is among the users or customers and the available products or media content of a system. Typically, known information is collected from the users and aggregated at a centralized location, such as a server. Patterns, such as similarities between two or more users or similarities between two or more products, among the collected data are located and used as the basis for making recommendations. Consequently, information that may be used to identify individual users and/or client devices associated with the users are also collected by the recommendation system, since the system needs to be aware of each user's personal taste in order to personalize the recommendations for that user.

Providing information that may be used to identify a particular user, such as the user's login name or email address, or a particular client device associated with a user, such the device's MAC (Media Access Control) address or IP (Internet Protocol) address, may raise privacy concerns to some users. Some users may choose to forego the benefit of receiving personalized product recommendations in order to protect their privacy by refusing to provide any information that may be used to identify themselves or their client devices. As a result, such users do not enjoy the full benefits of the services provided by the businesses. At the same time, the businesses may loose profit because some of their customers or users are not aware of certain products the businesses offer that may be of great interest to these customers or users.

SUMMARY OF THE INVENTION

Broadly speaking, the present invention generally relates to using Collaborative Filtering that employs matrix factorization to make personalized recommendations of items, such as products or media content, while preserving complete user privacy.

According to one embodiment, method and computer program product for providing personalized recommendations to anonymous users are provided. At a server, factorizing a rating matrix, denoted by $M_R$, into a user feature matrix, denoted by $M_U$, and an item feature matrix, denoted by $M_I$, wherein the rows of $M_R$ correspond to a plurality of users, the columns of $M_R$ correspond to a plurality of items, each of the cells of $M_R$ represents a rating associated with a corresponding item for a corresponding user, and $M_R = M_U \times M_I$, and transmitting the item feature matrix, $M_I$, to selected ones of a plurality of client devices associated with the plurality of users. At one of the selected ones of the plurality of client devices associated with one of the plurality of users, calculating a user feature vector, denoted by $V_U$, based on the item feature matrix, $M_I$, and a rating vector, denoted by $V_R$, wherein each of the cells of $V_R$ represents a rating associated with a corresponding one of the plurality of items for the one user, and $V_R = V_U \times M_I$.

According to another embodiment, a method of obtaining an item feature matrix, denoted by $M_I$, at a server to be used for providing personalized recommendations to anonymous users is provided. Aggregating a plurality of rating vectors, denoted by $V_R$, each provided by an anonymous client device, into a rating matrix, denoted by $M_R$, wherein the rows of $M_R$ correspond to a plurality of anonymous users, the columns of $M_R$ correspond to a plurality of items, each of the cells of $M_R$ represents a rating associated with a corresponding item for a corresponding anonymous user, and selected cells of $M_R$ have received ratings from the corresponding anonymous users for the corresponding items. Factorizing the rating matrix, $M_R$, into a user feature matrix, denoted by $M_U$, and an item feature matrix, denoted by $M_I$, wherein $M_R = M_U \times M_I$. And transmitting the item feature matrix, $M_I$, to selected ones of a plurality of anonymous client devices associated with the plurality of anonymous users.

According to another embodiment, a method of providing personalized recommendations at a client device while maintaining anonymity of the client device and a user associated with the client device is provided. Anonymously transmitting a rating vectors, denoted by $V_R$, to a server, wherein each of the cells of $V_R$ represents a rating associated with a corresponding one of a plurality of items for the user, and selected cells of $V_R$ have received ratings from the user for the corresponding items. Receiving an item feature matrix, denoted by $M_I$, from the server. Calculating a user feature vector, denoted by $V_U$, based on the item feature matrix, $M_I$, and the rating vector, $V_R$, wherein $V_R = V_U \times M_I$. And recommending selected ones of the plurality of items that have not received ratings from the user to the user based on the user feature vector, $V_U$, and the item feature matrix, $M_I$.

According to another embodiment, a system for providing personalized recommendations to anonymous users is provided. A server is arranged to factorize a rating matrix, denoted by $M_R$, into a user feature matrix, denoted by $M_U$, and an item feature matrix, denoted by $M_I$, wherein the rows of $M_R$ correspond to a plurality of users, the columns of $M_R$ correspond to a plurality of items, each of the cells of $M_R$ represents a rating associated with a corresponding item for a corresponding user, and $M_R = M_U \times M_I$, and transmit the item feature matrix, $M_I$, to selected ones of a plurality of client devices associated with the plurality of users. An anonymizer is arranged to relay communications between the server and the selected ones of the plurality of client devices so that the plurality of client devices and their associated users remain anonymous to the server. And one of the plurality of client devices is arranged to calculate a user feature vector, denoted by $V_U$, based on the item feature matrix, $M_I$, and a rating vector, denoted by $V_R$, wherein each of the cells of $V_R$ represents a rating associated with a corresponding one of the plurality of items for the one user, and $V_R = V_U \times M_I$.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
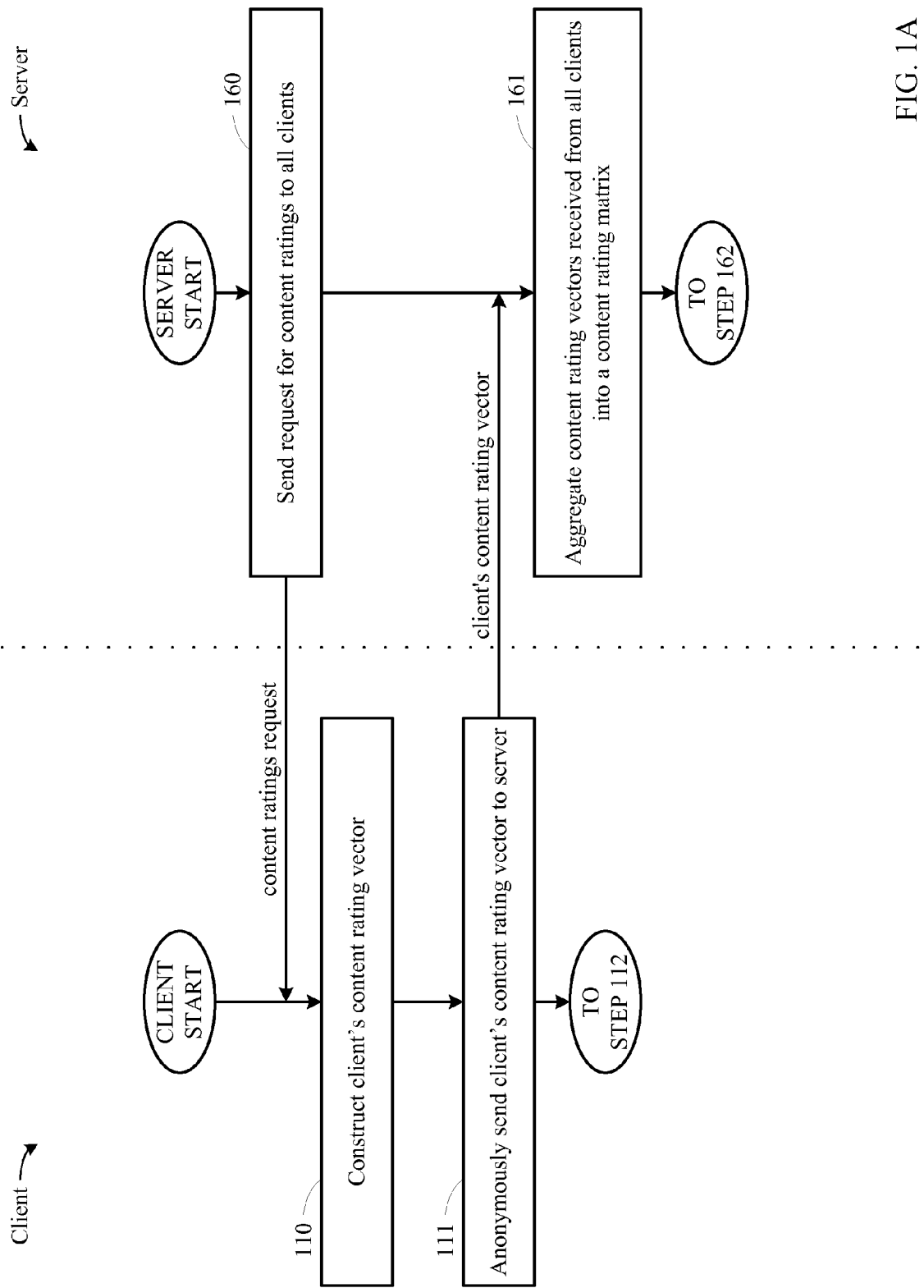
FIGS. 1A-1B illustrate a method of providing personalized recommendations to anonymous users using Collaborative Filtering that employs matrix factorization according to one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Because of the vast amount of products, such as audios, videos, graphics, books, games, consumer electronics, etc., currently available from a variety of different sources, various entities, such as websites, businesses, etc., often wish to provide personalized recommendations to their users and/or customers with respect to the products they have available. The recommendations are personalized in the sense that they take into consideration what an individual user or customer may like or dislike, since what may be interesting to one individual may not be interesting to another individual, as people have different tastes or preferences.

Traditionally, recommendations may be personalized for individual users using various methods, depending on what information is available to the recommendation system. For example, if there is no user information, i.e., information regarding user behavior, user preferences, etc., available, the recommendation system may make recommendations solely based on content information or characteristics with respect to the available products, such as analyzing similarities among multiple items. On the other hand, if there is user information available, the recommendation system may make recommendations based on user information and/or product characteristics, such as using Collaborative Filtering.

Generally speaking, personalized recommendations that take into consideration of the user information provide better results. However, in order to collect useful user information, it is necessary for a recommendation system to request or obtain such user information from individual users. For example, websites often request their users to register and create user accounts before receiving personalized services. Users are asked to provide information about themselves, such as their age, gender, occupation, education, geographic location, hobbies, interests, etc. Subsequently, as users interact with the websites, their actions are monitored, collected, and analyzed to determine their personal preferences.

Requesting a user to provide information that may be used to identify that user in order for the user to receive personalized recommendations may raise privacy concerns to some users. Some users may be especially sensitive about protecting their personal privacy that even if the system assures these users that their identifying information will not be used for any other purposes or shared with any other third parties without their explicit permissions, some users may still feel uneasy about giving out their identifying information. Some users may not wish to let others know about their personal preferences with respect to media content. As a result, such users may choose to forego the benefit of receiving personalized media content recommendations in order to protect their privacy.

According to various embodiments, to fully protect user privacy while still providing personalized recommendations individually tailored to anonymous users, methods of providing personalized recommendations using Collaborative Filtering that employs matrix factorization are provided. User ratings with respect to a set of items are collected from individual users through their associated client devices completely anonymously and sent to a central location, such as a server, in the form of rating vectors. The server aggregates the rating vectors received from multiple client devices into a rating matrix. The rows of the rating matrix correspond to the users and the columns of the rating matrix correspond to the items. Each of the cells in the rating matrix represents a rating associated with the corresponding item for the corresponding user.

The server derives from the rating matrix a user feature matrix and an item feature matrix using matrix factorization by approximation, such that the rating matrix is the product of the user feature matrix and the item feature matrix. The server then sends the item feature matrix to the client devices.

A client device, after receiving the item feature matrix from the server, calculates its own user feature vector using the item feature matrix and its own rating vector, such that the client's rating vector is the product of the client's user feature vector and the item feature matrix. In other words, the client's own user feature vector approximates the row corresponding to the user associated with the client device in the user feature matrix calculated at the server. Finally, personalized recommendations are made to the user associated with the client device using the item feature matrix and the client's own user feature vector.

Periodically, the server recollects updated rating vectors from the client devices and recalculates the item feature matrix and the user feature matrix so that recommendations are made using the updated information. For example, as new items and/or new ratings from various users become available, the system may recollect the updated rating vectors from the client devices and recalculates the item feature matrix and the user feature matrix.

Figure 1B:
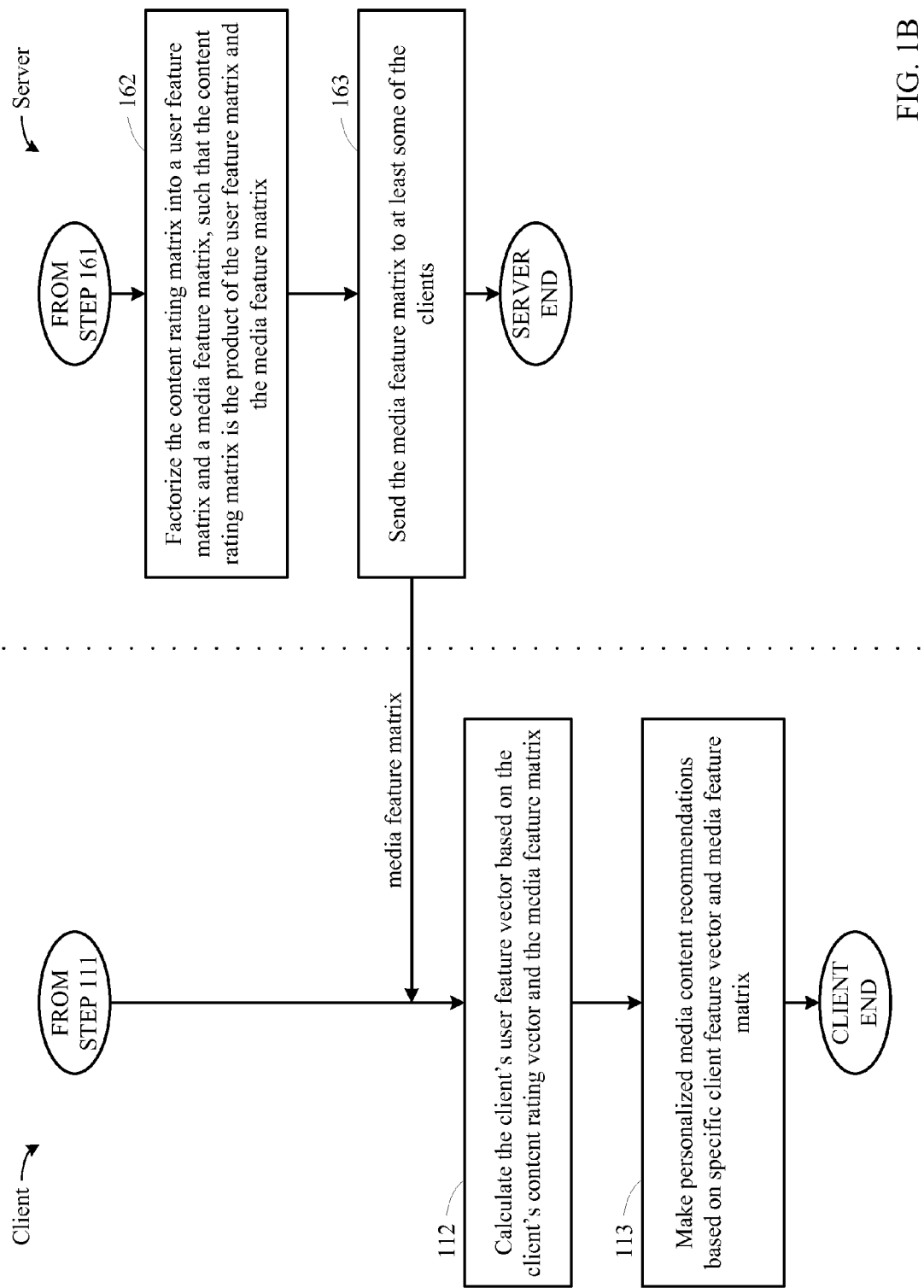

FIGS. 1A-1B illustrate a method of providing personalized recommendations to anonymous users using Collaborative Filtering that employs matrix factorization according to one embodiment of the invention. This method may be applied to any set of items that is capable of receiving user ratings. For example, the set of items may be media content, such as audios, videos, graphics, images, documents, etc., or consumer products, such as books, consumer electronics, apparels, jewelries, etc., or types of service providers, such as hotels, restaurants, airlines, etc. However, to simplify the discussion, the steps illustrated in FIGS. 1A-1B are described specifically with respect to a set of media content and a group of users.

Suppose there is a set of items, i.e., media content, and each piece of media content in the set is identified by a unique identifier. In this example, the set of media content is denoted by $MC_1$ to $MC_j$, where j represents the total number of pieces of media content in the set. In addition, there is a group of users, denoted by $U_1$ to $U_i$, where represents the total number of users in the group. There is no limit on the number of items, i.e., j, that may be included in the set or the number of users, i.e., i, that may be included in the group. In practice, there are often hundreds, thousands, or even hundreds of thousands of items and users involved. Again, to simplify the discussion, the steps illustrated in FIGS. 1A-1B are described with respect to twenty (20) pieces of media content, i.e., j=20, denoted by $MC_1$ to $MC_{20}$, and eight (8) users, i.e., i=8, denoted by $U_1$ to $U_8$.

Each user has rated some of the pieces of media content in the set. However, it is unlikely that a single user has rated all the available pieces of media content in the set, since in practice, the number of pieces of media content in the set tends to be very large. The actual rating values may be represented using any scale system, e.g., numerical, alphabetical, alphanumerical, etc.

Consequently, the ratings with respect to the set of media content provided by each user may be represented in vector format, i.e., a rating vector, denoted by $V_R$. The following Table 1 shows a sample rating vector for user $U_1$, denoted by $V_R(U_1)$.

TABLE 1

| Rating Vector for User $U_1$, $V_R(U_1)$ | | | | | | | | | | | | | | | | | | | |
|---|---|---|---|---|---|---|---|---|---|---|---|---|---|---|---|---|---|---|---|
| $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
| 3 |  | 5 | 2 | 5 |  | 1 |  | 4 |  |  |  |  | 3 | 2 | 1 |  | 4 |  |  |

The rating vector for user $U_1$, $V_R(U_1)$, has twenty (20) elements, i.e., cells, corresponding to the twenty (20) pieces of media content in the set. In the sample shown in Table 1, a numerical rating system having values between 1 and 5 is used. If user $U_1$ has rated a particular piece of media content, then the corresponding rating value is indicated in the appropriate cell. Conversely, if user $U_1$ has not rated a particular piece of media content, then the cell correspond to that piece of media content is left empty. Thus, as indicated in Table 1, user $U_1$ has rated media content $MC_1$, $MC_3$, $MC_4$, $MC_5$, $MC_7$, $MC_9$, $MC_{14}$, $MC_{15}$, $MC_{16}$, and $MC_{18}$. Since in practice, there often are a great number of available items, i.e., media content, included in the set, it is very unlikely for any single user to have rated all, or even a majority of the available pieces of media content in the set. Thus, a rating vector such as the one shown in Table 1 often includes many empty, i.e., unrated, cells.

The following Table 2 shows another sample rating vector, for user $U_2$, denoted by $V_R(U_2)$. Similar to $V_R(U_1)$, $V_R(U_2)$ also has twenty (20) elements, each corresponding to a piece of media content in the set.

TABLE 2

Rating Vector for User $U_2$, $V_R(U_2)$

| $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
|---|---|---|---|---|---|---|---|---|---|---|---|---|---|---|---|---|---|---|---|
|  |  | 5 |  | 5 |  |  |  | 2 |  | 1 |  | 3 |  |  |  |  |  |  | 4 |

Again, a numerical rating system having values between 1 and 5 is used in Table 2, and user $U_2$ has rated media content $MC_3$, $MC_5$, $MC_9$, $MC_{11}$, $MC_{13}$, and $MC_{20}$. Similar rating vectors as the ones shown in Tables 1 and 2 may be constructed for each of the other users in the group, i.e, $V_R(U_3)$ to $V_R(U_8)$ for users $U_3$ to $U_8$ respectively.

To start the Collaborative Filtering process, a server sends a request for rating vectors to all client devices (step 160). Since the server is not aware of the identities of the client devices, the server may broadcast the request throughout the system.

Each client device, upon receiving the request for rating vectors from the server, constructs a rating vector, $V_R(U_i)$, such as the ones shown in Tables 1 and 2, for the user associated with the client device (step 110). In each of the rating vectors, those cells corresponding to the pieces of media content that have been rated by the user are filled with the actual rating values, while those cells corresponding to the pieces of media content that have not been rated by the user are left empty.

There are a variety of different ways to obtain rating values on selected pieces of media content from a user. For example, a user may manually rate some pieces of the media content from the set. Alternatively or in addition, user ratings may be automatically determined for various pieces of media content based on client device usage information monitored for the client device associated with the user. A few appropriate media content auto-raters are described in more detail in co-pending U.S. patent application Ser. No. 12/120,217, filed on May 13, 2008, entitled "SYSTEM AND METHOD FOR AUTOMATICALLY RATING VIDEO CONTENT" by Gibbs et al., which is hereby incorporated by reference in its entirety and for all intents and purposes.

Each client device then sends its own rating vector, $V_R(U_i)$, to the server anonymously (step 111). By anonymous, the client device does not provide any identifying information that may be used to identify the sending client device, such as a MAC address or an IP address, to the server. Similarly, no identifying information that may be used to identify the user associated with the client device, such as a user login or password, is provided to the server.

Again, there are a variety of different ways to send information from a client device to a server anonymously. According to one embodiment, either a protocol specific or a protocol independent anonymizer or anonymous proxy is used. For example, a trusted third-party intermediary may be used to relay the rating vectors from the client devices to the server. A client device first sends its rating vector to the third-party intermediary. The third-party intermediary removes any identifying information from the client transmission, and forwards only the rating vector to the server. Optionally, the third-party intermediary may assign another identifier, e.g., a random number, to each rating vector, and this identifier assigned by the third-party intermediary cannot be used to trace back to its original sender client device before forwarding it to the server.

The rating vectors received by the server do not contain any information that may be used to identify the client devices or their associated users from where the vectors have originally been sent. Instead, the server assigns its own unique identifier to each received rating vector, but this identifier is only used by the server and has no relationship to any actual identifying information with respect to the sending client devices or their associated users.

It is possible that some client devices may attempt to send multiple rating vectors to the server. One way to prevent this is to restrict the third-party intermediary to forward only one rating vector from each client device to the server, since the third-party intermediary is aware of the identity of the client device from where a rating vector has been sent. The third-party intermediary may record the identity of each client device for which it has received a rating vector and forwarded the rating vector to the server. Any subsequent rating vectors received from those client devices that have already been recorded are ignored.

The server aggregates all rating vectors, $V_R(U_i)$, received from client devices to construct a rating matrix, denoted by $M_R$ (step 161). The rows of the rating matrix, $M_R$, correspond to the users in the group, i.e., one row per user, and the columns of the rating matrix, $M_R$, correspond to the pieces of media content in the set, i.e., one column per piece of media content. The following Table 3 illustrates a sample rating matrix with eight (8) users, i.e., eight (8) rows, and twenty (20) pieces of media content, i.e., twenty (20) columns.

TABLE 3

Rating Matrix between Eight Users and Twenty Pieces of Media Content

|  | $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
|---|---|---|---|---|---|---|---|---|---|---|---|---|---|---|---|---|---|---|---|---|
| $U_1$ | 3 |  | 5 | 2 | 5 |  | 1 |  | 4 |  |  |  | 3 | 2 | 1 |  | 4 |  |  |  |
| $U_2$ |  |  | 5 |  | 5 |  |  |  | 2 |  | 1 |  | 3 |  |  |  |  |  |  | 4 |
| $U_3$ |  |  |  |  | 3 | 1 |  |  | 2 |  | 3 |  |  | 1 |  |  |  | 2 |  |  |
| $U_4$ |  | 3 |  |  |  |  |  | 3 |  | 4 | 2 |  |  |  |  |  |  |  |  |  |
| $U_5$ |  |  | 2 |  |  | 2 |  | 4 |  |  |  |  | 3 |  |  | 1 | 3 |  |  | 3 |

TABLE 3-continued

Rating Matrix between Eight Users and Twenty Pieces of Media Content

| | MC$_1$ | MC$_2$ | MC$_3$ | MC$_4$ | MC$_5$ | MC$_6$ | MC$_7$ | MC$_8$ | MC$_9$ | MC$_{10}$ | MC$_{11}$ | MC$_{12}$ | MC$_{13}$ | MC$_{14}$ | MC$_{15}$ | MC$_{16}$ | MC$_{17}$ | MC$_{18}$ | MC$_{19}$ | MC$_{20}$ |
|---|---|---|---|---|---|---|---|---|---|---|---|---|---|---|---|---|---|---|---|---|
| U$_6$ | | | | | 4 | 2 | 1 | | | | 2 | | | | | | 4 | | 3 | |
| U$_7$ | 3 | 4 | | 2 | | | | 2 | | | | | | 3 | | | | | | |
| U$_8$ | | | 2 | | | 1 | 5 | | | | | 2 | | 5 | | | | | | 5 |

In Table 3, the first row corresponds to the rating vector provided by user U$_1$, V$_R$(U$_1$), as shown in Table 1; the second row corresponds to the rating vector provided by user U$_2$, V$_R$(U$_2$), as shown in Table 2; the third row corresponds to the rating vector provided by user U$_3$; and so on. Some of the cells in the rating matrix have been filled with actual ratings, while other cells are empty. For example, in the third row corresponding to user U$_3$, those cells correspond to media content MC$_6$, MC$_7$, MC$_{10}$, MC$_{12}$, MC$_{15}$, and MC$_{19}$ have actual rating values, because user U$_3$ has rated these pieces of media content, while those cells correspond to media content MC$_1$, MC$_2$, MC$_3$, MC$_4$, MC$_5$, MC$_8$, MC$_9$, MC$_{11}$, MC$_{13}$, MC$_{14}$, MC$_{16}$, MC$_{17}$, MC$_{18}$, and MC$_{20}$ are empty, because user U$_3$ has not rated those pieces of media content The server factorizes the rating matrix, M$_R$, into a user feature matrix, denoted by M$_U$, and a media feature matrix, denoted by M$_M$, by approximation such that the rating matrix, M$_R$, equals the product of the user feature matrix, M$_U$, and the media feature matrix, M$_M$ (step 162). This relationship between the rating matrix, M$_R$, the user feature matrix, M$_U$, and the media feature matrix, M$_M$, may be expressed using the following equation:

$$M_R = M_U \times M_M \quad (1)$$

Generally speaking, matrix factorization, in the mathematical discipline of linear algebra, is a factorization of a matrix into some canonical form. The standard methods for matrix factorization generally expect that the cells in the matrix to be factorized have known values. In the case of the rating matrix, M$_R$, however, not all the cells in the rating matrix, M$_R$, have known values. Thus, matrix factorization as applied to the rating matrix, M$_R$, is done through approximation. There are a variety of different ways to perform factorization on a matrix by approximation. One embodiment of matrix factorization by approximation is described in more detail below in FIG. 2, which may be used to factorize the rating matrix, M$_R$, into the user feature matrix, M$_U$, and the media feature matrix, M$_M$.

The number of rows in the user feature matrix, M$_U$, equals the number of rows in the rating matrix, M$_R$, each row corresponding to a user. The number of columns in the media feature matrix, M$_M$, equals the number in columns of the rating matrix, M$_R$, each column corresponding to a piece of media content The number of columns in the user feature matrix, M$_U$, equals the number of rows in the media feature matrix, M$_M$.

The following Table 4 illustrates a sample user feature matrix with eight (8) rows corresponding to the eight (8) users in the rating matrix shown in Table 3 and three (3) columns, each column corresponding to a user feature.

TABLE 4

User Feature Matrix Having Eight Users and Three User Features

| | User Feature 1 | User Feature 2 | User Feature 3 |
|---|---|---|---|
| U$_1$ | | | |
| U$_2$ | | | |
| U$_3$ | | | |
| U$_4$ | | | |
| U$_5$ | | | |
| U$_6$ | | | |
| U$_7$ | | | |
| U$_8$ | | | |

The following Table 5 illustrates a sample media feature matrix with three (3) rows, each row corresponding to a media feature, and twenty (20) columns corresponding to the twenty (2) pieces of media content in the rating matrix shown in Table 3.

TABLE 5

Media Feature Matrix Having Twenty Pieces of Media Content and Three Media Features

| | MC$_1$ | MC$_2$ | MC$_3$ | MC$_4$ | MC$_5$ | MC$_6$ | MC$_7$ | MC$_8$ | MC$_9$ | MC$_{10}$ | MC$_{11}$ | MC$_{12}$ | MC$_{13}$ | MC$_{14}$ | MC$_{15}$ | MC$_{16}$ | MC$_{17}$ | MC$_{18}$ | MC$_{19}$ | MC$_{20}$ |
|---|---|---|---|---|---|---|---|---|---|---|---|---|---|---|---|---|---|---|---|---|
| MF1 | | | | | | | | | | | | | | | | | | | | |
| MF2 | | | | | | | | | | | | | | | | | | | | |
| MF3 | | | | | | | | | | | | | | | | | | | | |

The relationship between individual cells in the rating matrix, M$_R$, the user feature matrix, M$_U$, and the media feature matrix, M$_M$, may be expressed using the following equation:

$$m_{R(i,j)} = \sum_{r=1}^{r=k} (m_{U(i,r)} m_{M(r,j)}); \quad (2)$$

where m$_{R(i,j)}$ denotes a cell in the rating matrix, M$_R$, at the i$^{th}$ row and the j$^{th}$ column, m$_{U(i,\ r)}$ denotes the cells in the user feature matrix, $M_U$, in the $i^{th}$ row, $m_{M(r,j)}$ denotes the cells in the media feature matrix, $M_M$, in the $j^{th}$ column, and k denotes the number of columns in the user feature matrix, $M_U$, and the number of rows in the media feature matrix, $M_M$. In the examples shown in Tables 3, 4, and 5, k equals 3.

Once the server has obtained the media feature matrix, $M_M$, using matrix factorization, it sends the media feature matrix, $M_M$, to the client devices (step 163). The server may broadcast the media feature matrix, $M_M$, throughout the system. Alternatively, the server may use the anonymous proxy to relay the media feature matrix, $M_M$, to the client devices, i.e., server sending the media feature matrix, $M_M$, to the anonymous proxy, and the anonymous proxy then forwarding the media feature matrix, $M_M$, to the client devices.

A client device, upon receiving the media feature matrix, $M_M$, from the server, calculates its own user feature vector, denoted by $V_U$, since there is only one client, based on its rating vector, $V_R$, and the media feature matrix, $M_M$, such that the client's rating vector, $V_R$, equals the product of the client's user feature vector, $V_U$, and the media feature matrix, $M_M$ (step 122). In fact, a client's user feature vector, $V_U$, approximates to the row associated with this client in the user feature matrix, $M_U$, as shown in Table 4 calculated on the server. This relationship between the client's rating vector, $V_R$, the client's user feature vector, $V_U$, and the media feature matrix, $M_M$ may be expressed using the following equation:

$$V_R = V_U \times M_M. \quad (3)$$

The following Table 6 illustrates a sample user feature vector having three (3) elements, i.e., cells, each cell corresponding to a user feature.

TABLE 6

| User Feature Vector Having Three User Features | | |
|---|---|---|
| User Feature 1 | User Feature 2 | User Feature 3 |
|  |  |  |

The relationship between individual cells in a client's rating vector, $V_R$, the client's feature vector, $V_U$, and the media feature matrix, $M_M$, may be expressed using the following equation:

$$v_{R(j)} = \sum_{r=1}^{r=k} (v_{U(r)} m_{M(r,j)}); \quad (4)$$

where $v_{R(j)}$ denotes the $j^{th}$ cell in the client's rating vector, $V_R$, $v_{U(r)}$ denotes the cells in the client's user feature vector, $V_U$, $m_{M(r,j)}$ denotes the cells in the media feature matrix, $M_M$, in the $j^{th}$ column, and k denotes the number of cells in the client's user feature vector, $V_U$, and the number of rows in the media feature matrix, $M_M$. In the examples shown in Tables 5 and 6, k equals 3.

Figure 3:
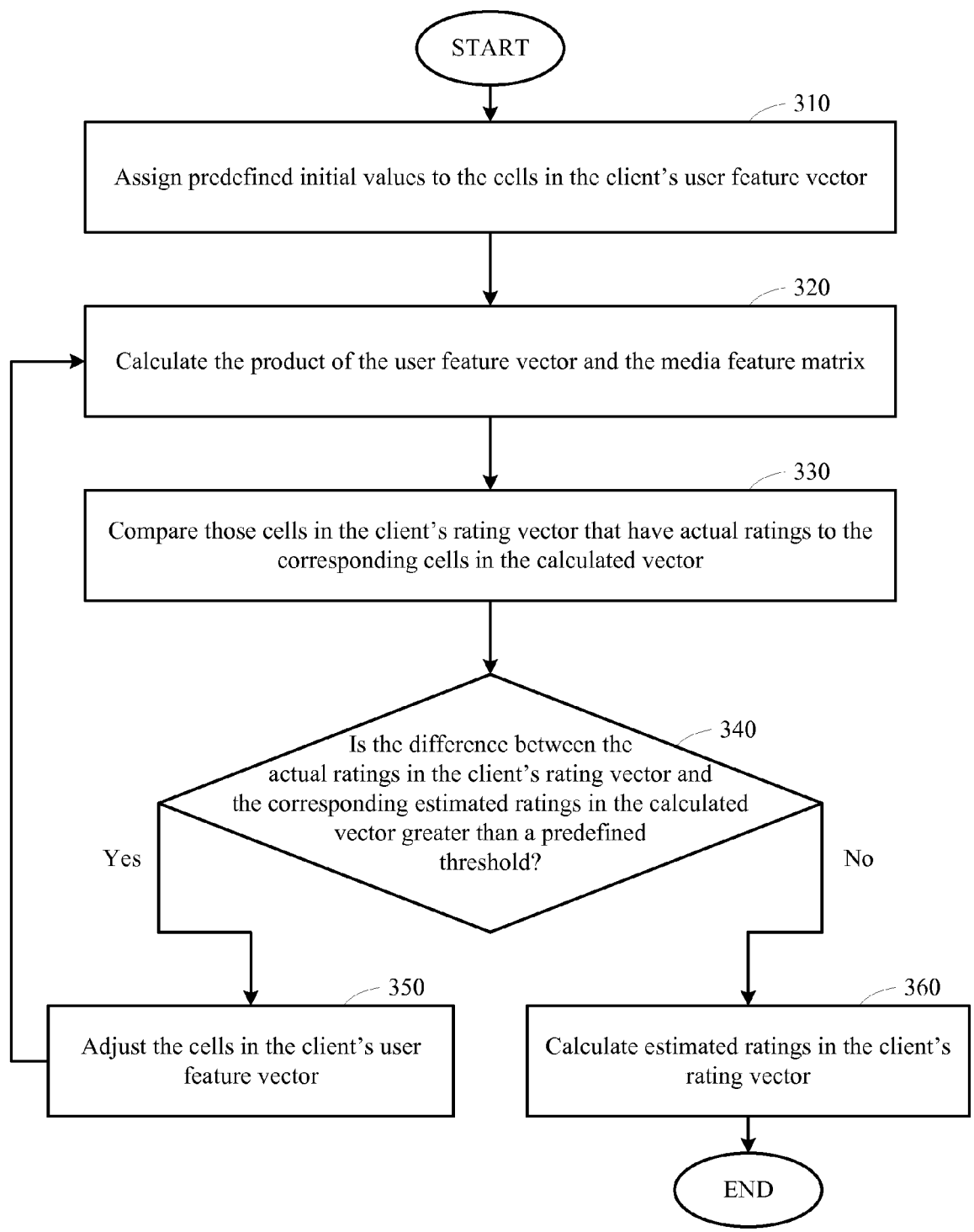
FIG. 3 illustrates a method of calculating a client's user feature vector based on the item feature matrix and the client's rating vector.

One embodiment of calculating a client's user feature vector, $V_U$, based on the client's rating vector, $V_R$, and the media feature matrix, $M_M$, is described in more detail below in FIG. 3.

Once a client device has calculated its own user feature vector, $V_U$, personalized recommendations with respect to selected pieces of the media content may be made to the user associated with the client device based on the client's user feature vector, $V_U$, and the media feature matrix, $M_M$ (step 113). As will be explained below in FIG. 3, at the end of the process of calculating the client's user feature vector, $V_U$, all the empty cells in the client's rating vector, $V_R$, will have estimated rating values as well. In other words, those pieces of media content that the user has not actually rated will receive estimated ratings, which are estimated based on the media feature matrix, $M_M$, and the rating values for those pieces of media content that the user has actually rated.

Thus, according to one embodiment, all the pieces of media content in the set may be ranked based on their actual or estimated ratings. Thereafter, selected pieces of media content, i.e., those pieces having relatively high estimated ratings, may be recommended to the user associated with the client device. In this case, the recommendations are personalized for the user because the ratings used to determine the rankings for the media content are either actual ratings provided by the user or estimated ratings determined based on the user's own user feature vector, $V_U$.

In a media feature matrix, $M_M$, each column corresponds to a piece of media content. Thus, in the sample media feature matrix shown in Table 5, there are twenty (20) columns corresponding to the twenty (20) pieces of media content in the media content set. Each column represents a media feature vector, denoted by $V_M$, for the corresponding piece of media content. For example, the first column in Table 5 represents the media feature vector for media content $MC_1$; the second column represents the media feature vector for media content $MC_2$; the third column represents the media feature vector for media content $MC_3$; and so on According to another embodiment, similarities between two pieces of media content may be determined by taking the product of their respective media feature vectors, which may be expressed using the following equation:

$$\text{similarity} = V_M(MC_i) \cdot V_M(MC_j); \quad (5)$$

where $V_M(MC_i)$ denotes the media feature vector for one piece of media content, $MC_i$, and $V_M(MC_j)$ denotes the media feature vector for another piece of media content, $MC_j$. The greater the similarity value, i.e. the product of the two media feature vectors, the more similar the two pieces of media content. This similarity value may be used to determine those pieces of media content in the media content set that are very similar to a piece of media content that has been rated highly by the user.

For example, the rating vector for user $U_1$, as shown in Table 1, indicates that user $U_1$ has given a high rating, 5, to media content $MC_3$, which suggests that user $U_1$ likes media content $MC_3$. It is reasonable to assume that user $U_1$ may also like other pieces of media content that are similarly to media content $MC_3$. Thus, similarities between media content $MC_3$ and other pieces of media content may be determined using equation (5), i.e., by take the product of the media feature vector for media content $MC_3$, $V_M(MC_3)$, and the media feature vector for each of the other pieces of media content that user $U_1$ has not actually rated. If the similarity value between media content $MC_3$ and another piece of media content is greater than or equal to a predefined threshold value, the other piece of media content is recommended to the user, as it is considered sufficiently similar to media content $MC_3$. In this case, the recommendations are personalized for the user because the recommended pieces of media content are similar to a piece of media content that is known to be favored by the user.

The steps illustrated in FIGS. 1A-1B may be repeated from time to time, such as when new items have become available and have been added to the item set, when new users have joined the user group, or when selected users have provided additional ratings or changed their existing ratings with respect to various items.

Matrix Factorization

Figure 2:
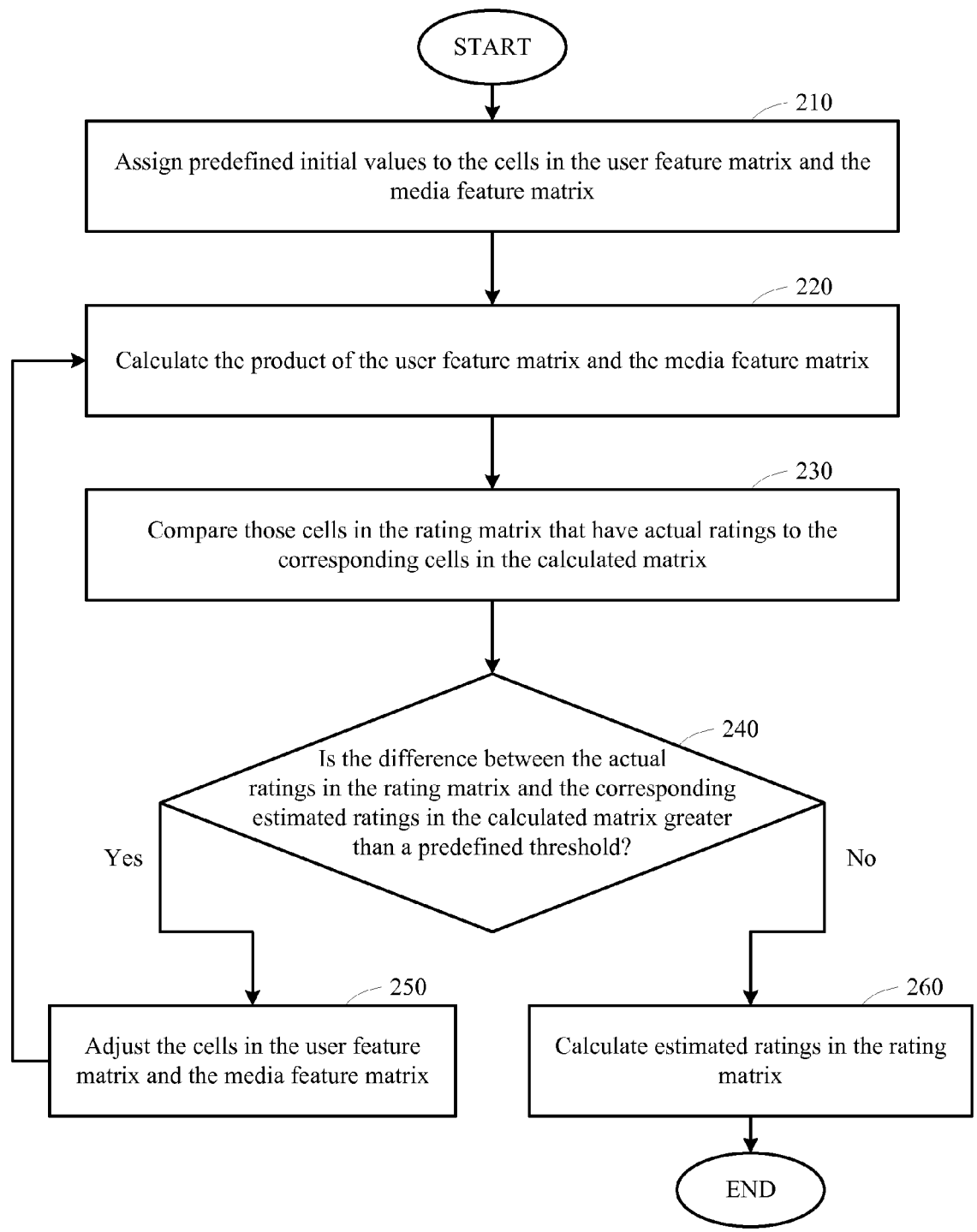
FIG. 2 illustrates a method of factorizing a rating matrix into a user feature matrix and an item feature matrix using matrix factorization by approximation according to one embodiment of the invention.

In step 162 shown in FIG. 1B, the server factorizes the rating matrix, $M_R$, into a user feature matrix, $M_U$, and a media feature matrix, $M_M$, such that $M_R = M_U \times M_M$. FIG. 2 illustrates a method of performing matrix factorization. The steps shown in FIG. 2 are described using the sample rating matrix, user feature matrix, and media feature matrix shown in Tables 3, 4, and 5 respectively.

The rules of matrix multiplication indicate that if a matrix, $M_1$ equals the product of two matrices, $M_1$ and $M_2$, i.e., $M = M_1 \times M_2$, then M and $M_1$ necessarily have the same number of rows, and M and $M_2$ necessarily have the same number of columns. In addition, the number of columns in necessarily $M_1$ equals the number of rows in $M_2$.

Applying this concept to the instant case, the rating matrix, $M_R$, and the user feature matrix, $M_U$, have the same number of rows, each row corresponding to a user. The rating matrix, $M_R$, and the media feature matrix, $M_M$, have the same number of columns, each column corresponding to a piece of media content. The number of columns in the user feature matrix, $M_U$, equals the number of rows in the media feature matrix, $M_M$. If $M_R$ is an i-by-j matrix, i.e., having i rows and j columns, then $M_U$ is an i-by-k matrix, having i rows and k columns, and $M_M$ is an k-by-j matrix, having k rows and j columns.

The sample rating matrix shown in Table 3 has 8 rows and 20 columns, the sample user feature matrix shown in Table 4 has 8 rows and 3 columns, and the sample media feature matrix shown in Table 5 has 3 rows and 20 columns. Thus, for these three matrices, i equals 8, j equals 20, and k equals 3.

The size of the rating matrix is determined by the number of users in the user group and the number of pieces of media content in the media content set. Each row in the rating matrix corresponds to a user, and each column in the rating matrix corresponds to a piece of media content. Consequently, the number of rows in the user feature matrix is determined by the number of users in the user group, i.e., i, with each row corresponding to a user, and the number of columns in the media feature matrix is determined by the number of pieces of media content in the media content set, i.e., j, with each column corresponding to a piece of media content.

The columns in the user feature matrix represent user features, with each column corresponding to a different user feature. The rows in the media feature matrix represent media features, with each row corresponding to a different media feature. The number of user features equals the number of media features, which is denoted by k. In theory, k may have any positive value. In practice, however, if k is too small, there may not be enough cells in the user and media matrices to accommodate all the numbers, and conversely, if k is too large, the calculations for matrix factorization may take too long and become too expensive. Experiments indicate that in practice, a number between 20 to 50 for k appears to work well. Nevertheless, to simplify the discussion, k is selected to be 3, a relatively small number, in the sample user feature matrix and media feature matrix shown in Tables 4 and 5 respectively.

Once the sizes of the user feature matrix and the media feature matrix are defined based on the size of the rating matrix and the number of user and media features desired, the cells of the user feature matrix and the media feature matrix are assigned one or more predefined initial value(s) (step 210). The actual criteria used to define the initial cell value often vary among the specific implementations of the matrix factorization process. For example, one implementation may define the initial cell value based on the scale system used for the rating values, such as using the medium number on the rating scale. Another implementation may define an arbitrary number. Another implementation may choose a different initial value to represent each user feature in the user feature matrix and each media feature in the media feature matrix. Although the initial value(s) may be any number, in practice, experiments indicate that small random numbers appear to work well.

Suppose an initial cell value of 2 is used. The following Table 7 illustrates the sample user feature matrix shown in Table 4 with all the cells having the initial value of 2.

TABLE 7

User Feature Matrix with Initial Cell Values

| | User Feature 1 | User Feature 2 | User Feature 3 |
|---|---|---|---|
| $U_1$ | 2 | 2 | 2 |
| $U_2$ | 2 | 2 | 2 |
| $U_3$ | 2 | 2 | 2 |
| $U_4$ | 2 | 2 | 2 |
| $U_5$ | 2 | 2 | 2 |
| $U_6$ | 2 | 2 | 2 |
| $U_7$ | 2 | 2 | 2 |
| $U_8$ | 2 | 2 | 2 |

The following Table 8 illustrates the sample media feature matrix shown in Table 5, again with all the cells having the initial value of 2.

TABLE 8

Media Feature Matrix with Initial Cell Values

| | $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
|---|---|---|---|---|---|---|---|---|---|---|---|---|---|---|---|---|---|---|---|---|
| MF1 | 2 | 2 | 2 | 2 | 2 | 2 | 2 | 2 | 2 | 2 | 2 | 2 | 2 | 2 | 2 | 2 | 2 | 2 | 2 | 2 |
| MF2 | 2 | 2 | 2 | 2 | 2 | 2 | 2 | 2 | 2 | 2 | 2 | 2 | 2 | 2 | 2 | 2 | 2 | 2 | 2 | 2 |
| MF3 | 2 | 2 | 2 | 2 | 2 | 2 | 2 | 2 | 2 | 2 | 2 | 2 | 2 | 2 | 2 | 2 | 2 | 2 | 2 | 2 |

To simplify the discussion, the same initial cell value, 2, is used for the three user features in Table 7 and the three media features in Table 8. Again, in practice, experiments indicate that a different small random number for each different user feature and media feature work well. For example, User Feature 1 may have an initial value of 1, User Feature 1 may have an initial value of 2, and User Feature 3 may have an initial value of 3. Similarly, Media Feature 1 may have an initial value of 4, Media Feature 2 may have an initial value of 5, and Media Feature 3 may have an initial value of 6.

The product of the user feature matrix and the media feature matrix is calculated (step 220). Suppose the resulting matrix is denoted by $M_P$. In this case, $M_P$ is an 8-by-20 matrix, same as the rating matrix, $M_R$. The cells of $M_P$ are calculated using equation (2), $$m_{P(i,j)} = \sum_{r=1}^{r=k} (m_{U(i,r)} m_{M(r,j)}).$$

The following Table 9 illustrates the matrix $M_P$, with its cells calculated using the initial values assigned to the user feature matrix and the media feature matrix, as shown in Tables 7 and 8 respectively.

rating value of 3, but the corresponding cell $m_P(1,1)$ from $M_P$ has a calculated value of 12, which is much greater than 3. Consequently, the values of those cells in the user feature matrix and the media feature matrix that affect the calculated value of cell $m_P(1,1)$, i.e., the first row from the user feature matrix and the first column from the media feature matrix, may be decreased accordingly. Similarly, the cell $m_R(5,3)$ from $M_R$ has an actual rating value of 5, but the corresponding cell $m_P(5,3)$ from $M_P$ has a calculated value of 12, which is also greater than 5. Consequently, the values of those cells in the user feature matrix and the media feature matrix that affect the calculated value of cell $m_P(5,3)$, i.e., the fifth row

TABLE 9

Product of the User Feature Matrix and the Media Feature Matrix

|   | $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
|---|---|---|---|---|---|---|---|---|---|---|---|---|---|---|---|---|---|---|---|---|
| $U_1$ | 12 | 12 | 12 | 12 | 12 | 12 | 12 | 12 | 12 | 12 | 12 | 12 | 12 | 12 | 12 | 12 | 12 | 12 | 12 | 12 |
| $U_2$ | 12 | 12 | 12 | 12 | 12 | 12 | 12 | 12 | 12 | 12 | 12 | 12 | 12 | 12 | 12 | 12 | 12 | 12 | 12 | 12 |
| $U_3$ | 12 | 12 | 12 | 12 | 12 | 12 | 12 | 12 | 12 | 12 | 12 | 12 | 12 | 12 | 12 | 12 | 12 | 12 | 12 | 12 |
| $U_4$ | 12 | 12 | 12 | 12 | 12 | 12 | 12 | 12 | 12 | 12 | 12 | 12 | 12 | 12 | 12 | 12 | 12 | 12 | 12 | 12 |
| $U_5$ | 12 | 12 | 12 | 12 | 12 | 12 | 12 | 12 | 12 | 12 | 12 | 12 | 12 | 12 | 12 | 12 | 12 | 12 | 12 | 12 |
| $U_6$ | 12 | 12 | 12 | 12 | 12 | 12 | 12 | 12 | 12 | 12 | 12 | 12 | 12 | 12 | 12 | 12 | 12 | 12 | 12 | 12 |
| $U_7$ | 12 | 12 | 12 | 12 | 12 | 12 | 12 | 12 | 12 | 12 | 12 | 12 | 12 | 12 | 12 | 12 | 12 | 12 | 12 | 12 |
| $U_8$ | 12 | 12 | 12 | 12 | 12 | 12 | 12 | 12 | 12 | 12 | 12 | 12 | 12 | 12 | 12 | 12 | 12 | 12 | 12 | 12 |

Since both the rating matrix, $M_R$, and $M_P$ equal the product of the user feature matrix and the media feature matrix, $M_R$ and $M_P$ in theory are the same matrix, and there is a one-to-one correlation between the cells in $M_R$ and the cells in $M_P$. As indicated in Table 3, some of the cells in the rating matrix, $M_R$, have actual ratings provided by the users, i.e., known rating values. For example, users $U_1$ and $U_7$ have rated media content $MC_1$; users $U_4$ and $U_7$ have rated media content $MC_2$; users $U_1$, $U_2$, and $U_8$ have rated media content $MC_3$; and so on. These actual rating values in the rating matrix, $M_R$, are used as indicators for estimating the cells in the user feature matrix and the media feature matrix.

For those cells in the rating matrix, $M_R$, that have actual rating values, the rating values are compared with the calculated values in the corresponding cells in $M_P$ (step 230). Thus, the actual rating in cell $m_R(1,1)$, 3, is compared with the calculated value in cell $m_P(1,1)$, 12; the actual rating in cell $m_R(1,3)$, 5, is compared with the calculated value in cell $m_P(1,1)$, 12; the actual rating in cell $m_R(1,4)$, 2, is compared with the calculated value in cell $m_P(1,4)$, 12; and so on.

By comparing every cell in $M_R$ that has an actual rating with every corresponding cell in $M_P$, the difference between the actual rating from $M_R$ and the calculated value from $M_P$ in the corresponding pair of cells is determined. According to one embodiment, the sum of all the differences between the actual ratings and the calculated values from the corresponding pairs of cells from $M_R$ and $M_P$ is compared against a predefined threshold value (step 240). Alternatively, the average of all the differences between the actual ratings and the calculated values from the corresponding pairs of cells from $M_R$ and $M_P$ is compared against another predefined threshold value (step 240).

In either case, if the differences are greater than the predefined threshold value, then the values of the individual cells in the user feature matrix and the media feature matrix are adjusted so that the product of the user feature matrix and the media feature matrix becomes closer to the rating matrix (step 250). For example, the cell $m_R(1,1)$ from $M_R$ has an actual from the user feature matrix and the third column from the media feature matrix, may be decreased accordingly.

The actual adjustments made to the individual cells in the user feature matrix and the media feature matrix are determined by considering the differences between all the actual ratings from $M_R$ and the calculated values from $M_P$ in the corresponding pairs of cells as a whole. Each cell in the user feature matrix and the media feature matrix is used in the calculation of multiple cells in $M_P$. Thus, each cell in the user feature matrix and the media feature matrix is adjusted by taking into consideration of all the cells in $M_P$ it affects.

Once appropriate adjustments are made to the values of the cells in the user feature matrix and the media feature matrix, a new $M_P$ is calculated using the adjusted cell values (step 220), and the new $M_P$ is again compared with $M_R$ (step 230) for further adjustments to the cells in the user feature matrix and the media feature matrix (step 250) if necessary. Steps 220, 230, 240, and 250 may be repeated as many times as necessary, until the difference between the actual ratings from $M_R$ and the calculated values from $M_P$ in the corresponding pairs of cells is less than or equal to the predefined threshold value (step 240).

Once the user feature matrix and the media feature matrix are determined, the empty cells in the rating matrix, $M_R$, i.e., those cells where the corresponding users have not rated the corresponding pieces of media content, may receive estimated rating values by calculating the product of the resulting user feature matrix and media feature matrix (step 260). Thus, at the end of the matrix factorization process, all the cells in the rating matrix, $M_R$, either have actual rating values provided by the users or estimated rating values calculated from the user feature matrix and the media feature matrix.

Client User Feature Vector

In step 112 shown in FIG. 1B, after a client device receives the media feature matrix, $M_M$, the client calculates its own user feature vector, $V_U$, based on the media feature matrix, $M_M$, received from the server and the client's own rating vector, $V_R$. FIG. 3 illustrates a method of calculating a client's user feature vector. The steps shown in FIG. 3 are described using the sample rating vector for user $U_1$ and media feature matrix shown in Tables 1 and 5 respectively.

A client's user feature vector, $V_U$, is essentially the row in the user feature matrix, $M_U$, that corresponds to the user associated with the client device. The process shown in FIG. 3 is very similar to the process shown in FIG. 2, with the client's rating vector replacing the rating matrix, and the client's user feature vector replacing the user feature vector. The client's rating vector is the product of the client's user feature vector and the media feature matrix, i.e., $V_R = V_U \times M_M$.

The size of the client's rating vector is determined by the number of pieces of media content in the media content set, with each cell corresponding to a piece of media content. Using the same notation as above, if there are j pieces of media content, then the client's rating vector has j cells. The media feature matrix, $M_M$, is an k-by-j matrix, having k rows and j columns, with each row corresponding to a media feature and each column corresponding to a piece of media content. According to the rules of matrix and vector multiplication, the client's user feature vector necessarily has k cells, with each cell corresponding to a user feature.

Applying this concept to the sample rating vector and media feature matrix shown in Tables 1 and 5 respectively, the client's user vector, $V_U$, has 3 cells. The following Table 10 illustrates a sample user feature vector having three (3) cells.

TABLE 10

User Feature Vector Having Three user Features

| User Feature 1 | User Feature 2 | User Feature 3 |
| --- | --- | --- |
|  |  |  |

Once a user feature vector is defined, its cells are assigned initial values (step 310). The initial values for the cells of the user feature vector may be chosen similar as in step 210 of FIG. 2, for the cells of the user feature matrix and the media feature matrix, i.e., based on some implementation-specific criteria. For this example, an initial cell value of 2 is again used.

The product of the user feature vector and the media feature matrix is calculated (step 320). Suppose the resulting vector is denoted by $V_P$. In this case, $V_P$ also has twenty (20) cells, because the media feature matrix has twenty (20) columns. The following Table 11 illustrates the vector, $V_P$, have cell values calculated based on the cell values in the user feature vector and the media feature matrix.

$MC_{18}$. These actual rating values in $V_R$ are compared with the calculated values in the corresponding cells in $V_P$ (step 330). Again, the actual rating values in user $U_1$'s rating vector, $V_R(U_1)$, are used as indicators for estimating the cells in user $U_1$'s user feature vector, $V_U(U_1)$.

For example, the actual rating in cell $V_R(1)$, 3, is compared with the calculated value in cell $m_P(1)$, 14; the actual rating in cell $m_R(3)$, 5, is compared with the calculated value in cell $m_P(3)$, 5; the actual rating in cell $m_R(4)$, 2, is compared with the calculated value in cell $m_P(4)$, 6; and so on.

By comparing every cell in $V_R$ that has an actual rating with every corresponding cell in $V_P$, the difference between the actual rating from $V_R$ and the calculated value from $V_P$ in the corresponding pair of cells is determined. According to one embodiment, the sum of all the differences between the actual ratings and the calculated values from the corresponding pairs of cells from $V_R$ and $V_P$ is compared against a predefined threshold value (step 340). Alternatively, the average of all the differences between the actual ratings and the calculated values from the corresponding pairs of cells from $V_R$ and $V_P$ is compared against another predefined threshold value (step 340).

In either case, if the differences are greater than the predefined threshold value, then the values of the individual cells in the client's user feature vector are adjusted so that the product of the client's user feature vector and the media feature matrix becomes closer to the client's rating matrix (step 350).

Similarly to step 250 in FIG. 2, the actual adjustments made to the individual cells in the client's user feature vector are determined by considering the differences between all the actual ratings from $V_R$ and the calculated values from $V_P$ in the corresponding pairs of cells as a whole. Each cell in the client's user feature vector is used in the calculation of multiple cells in $V_P$. Thus, each cell in the client's user feature vector is adjusted by taking into consideration of all the cells in $V_P$ it affects.

Once appropriate adjustments are made to the values of the cells in the client's user feature vector, a new $V_P$ is calculated using the adjusted cell values (step 320), and the new $V_P$ is again compared with $V_R$ (step 330) for further adjustments to the cells in the client's user feature vector (step 350) if necessary. Steps 320, 330, 340, and 350 may be repeated as many times as necessary, until the difference between the actual ratings from $V_R$ and the calculated values from $V_P$ in the corresponding pairs of cells is less than or equal to the predefined threshold value (step 340).

Once the client's user feature vector is determined, the empty cells in the client's rating matrix, $V_R$, i.e., those cells where the user has not rated the corresponding pieces of

TABLE 11

Product of the User Feature Vector and the Media Feature Matrix

| $MC_1$ | $MC_2$ | $MC_3$ | $MC_4$ | $MC_5$ | $MC_6$ | $MC_7$ | $MC_8$ | $MC_9$ | $MC_{10}$ | $MC_{11}$ | $MC_{12}$ | $MC_{13}$ | $MC_{14}$ | $MC_{15}$ | $MC_{16}$ | $MC_{17}$ | $MC_{18}$ | $MC_{19}$ | $MC_{20}$ |
| --- | --- | --- | --- | --- | --- | --- | --- | --- | --- | --- | --- | --- | --- | --- | --- | --- | --- | --- | --- |
| 14 | 2 | 5 | 6 | 8 | 1 | 9 | 20 | 6 | 10 | 7 | 3 | 16 | 4 | 2 | 15 | 18 | 3 | 6 | 8 |

Since both the client's rating vector, $V_R$, and $V_P$ equal the product of the client's user feature vector and the media feature matrix, $V_R$ and $V_P$ in theory are the same vector, and there is a one-to-one correlation between the cells in $V_R$ and the cells in $V_P$. Using user $U_1$'s rating vector as shown in Table 1 as an example, user $U_1$ has rated media content $MC_1$, $MC_3$, $MC_4$, $MC_5$, $MC_7$, $MC_9$, $MC_{14}$, $MC_{15}$, $MC_{16}$, and media content, may receive estimated rating values by calculating the product of the resulting client's user feature vector and the media feature matrix (step 360). Thus, at the end of the process in FIG. 3, all the cells in the client's rating vector, $V_R$, either have actual rating values provided by the user or estimated rating values calculated from the client's user feature vector and the media feature matrix.

System Architecture

Figure 4:
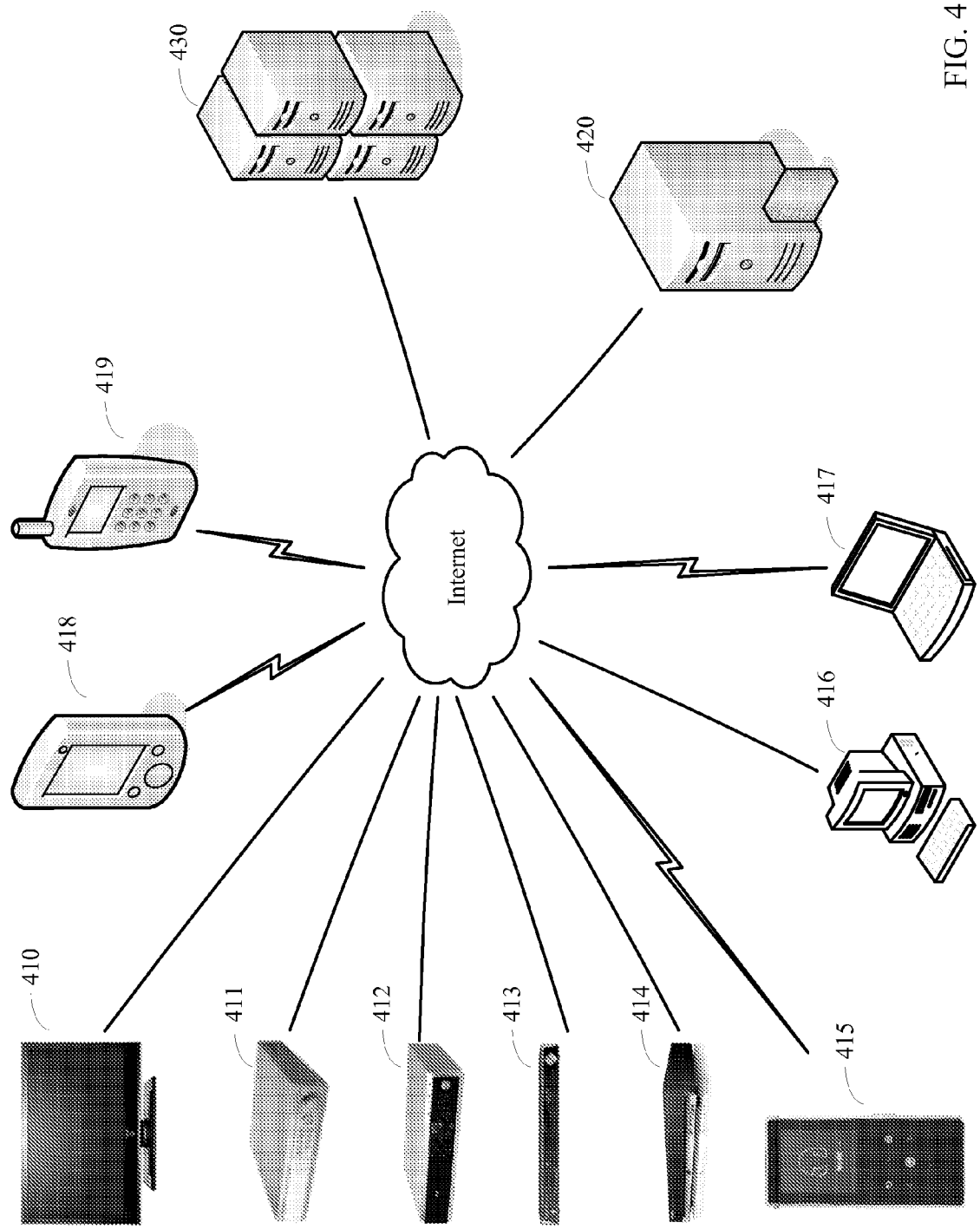
FIG. 4 is a simplified diagram of a network environment in which specific embodiments of the present invention may be implemented.

FIG. 4 is a simplified diagram of a network environment in which specific embodiments of the present invention may be implemented. The client devices may be any type of device that is capable of communicating with a server via the Internet through either wired or wireless connections. For example, the client devices may include televisions 410, digital or analog video recorders 411, audio/video controllers 412, DVD players or VCRs 413, set top boxes 414, portable media players 415, desktop computers 416, notebook or mobile computers 417, PDAs (personal digital assistant) 418, and smart telephones (419).

According to one embodiment, an anonymous proxy 420 forwards client communications to the application server 430 anonymously. In other words, the client devices 410-419 send their communications, e.g., rating vectors, to the anonymous proxy 420. The anonymous proxy 420 removes any information that may be used to identify the client devices 410-419 or users associated with the client devices 410-419 and then forwards the client communications to the server 430.

The server 430 aggregates the rating vectors received from the client devices 410-419 into a rating matrix, factorizes the rating matrix into a user feature matrix and an item feature matrix, and sends the item feature matrix back to the client devices 410-419. Each client device 410-419 then calculates its own user feature vector and makes personalized recommendations based on the client's user feature vector and the item feature matrix.

The steps shown in FIGS. 1A, 1B, 2 and 3, may be implemented as computer program product(s) having a set of computer program instructions. The computer program instructions with which embodiments of the invention are implemented may be stored in any type of computer-readable media, and may be executed according to a variety of computing models including, for example, on a consumer electronic device, on a stand-alone computing device, or according to a distributed computing model in which various of the functionalities described herein may be effected or employed at different locations.

Figure 5A:
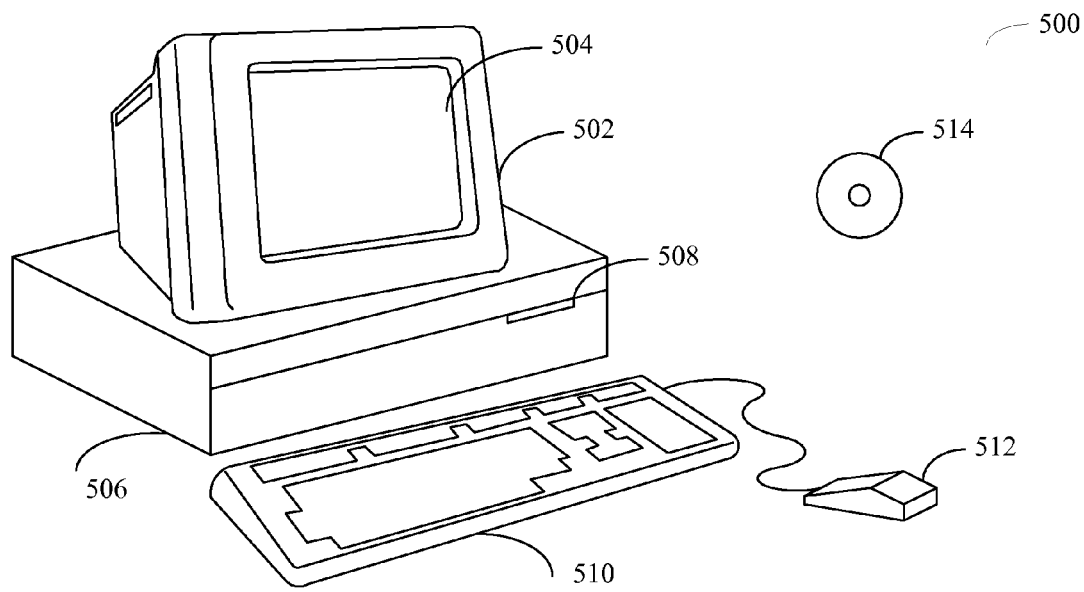
FIGS. 5A and 5B illustrate a computer system suitable for implementing embodiments of the present invention.
Figure 5B:
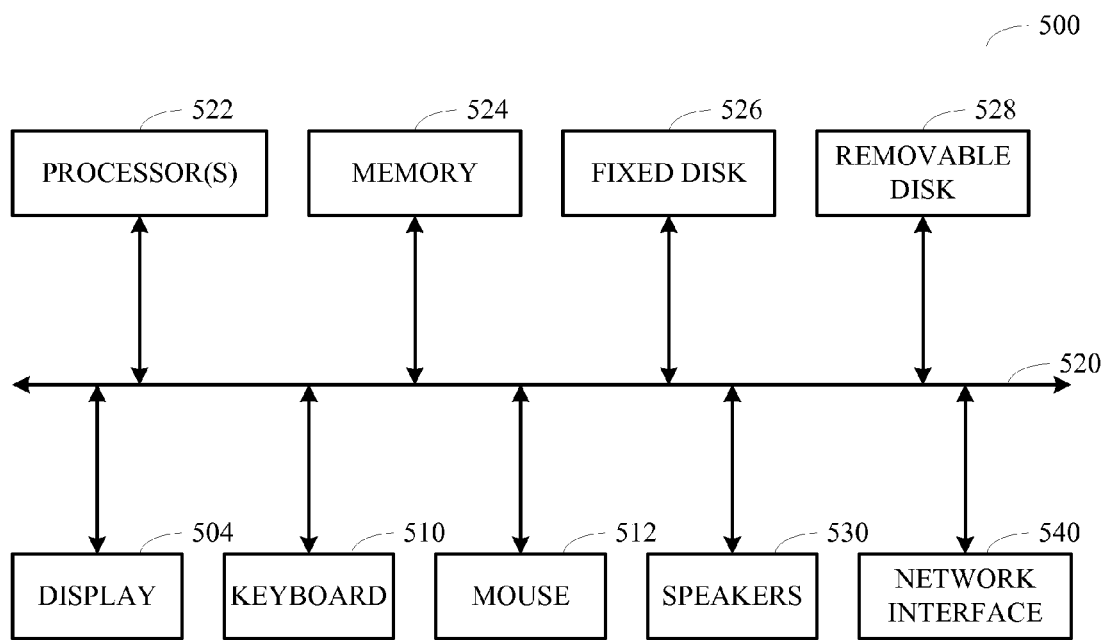

FIGS. 5A and 5B illustrate a computer system 500 suitable for implementing embodiments of the present invention. FIG. 5A shows one possible physical form of the computer system. The computer program instructions implementing the various embodiments of the invention may be executed on such a computer system. Of course, the computer system may have many physical forms including an integrated circuit, a printed circuit board, a small handheld device (such as a mobile telephone or PDA), a personal computer or a super computer. Computer system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computer system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 528 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

The present invention has several advantageous. For example, in addition to preserving complete user anonymity, by having each client device calculating its own user feature and personalize recommendations for its own user(s), the system is more scalable. At the same time, the workload on the server is eased as the server is no longer required to personalize recommendations for all client devices. Consequently, the performance of the server may be increased.

While this invention has been described in terms of several preferred embodiments, there are alterations, permutations, and various substitute equivalents, which fall within the scope of this invention. It should also be noted that there are many alternative ways of implementing the methods and apparatuses of the present invention.

For example, although the system and method are described in connection with ranking media content, the same concept may be applied to rank any item, objects, or matters that may be rated by users. The set of media content may be extended to a set of items of any type. The media feature matrix, $M_M$, then becomes the item feature matrix, which may be denoted by $M_I$, and the media feature vector, $V_M$, becomes the item feature vector, denoted by $V_I$.

The rating matrix, $M_R$, as constructed by the server, as shown in Table 3, places the users along the rows, i.e., each row corresponding to a user, and the items along the columns, i.e., each column corresponding to an item. One skilled in the art will appreciate that the steps shown in FIGS. 1A-1B may be modified so that the rating matrix, $M_R$, places the users along the columns, i.e., each column corresponding to a user, and the items along the rows, i.e., each row corresponding to an item. In this case, factorizing the rating matrix, $M_R$, results an item feature matrix, $M_I$, and a user feature matrix, $M_U$, such that $M_R = M_I \times M_U$. The item feature matrix, $M_I$, has the same number of rows as the rating matrix, $M_R$, and the user feature matrix, $M_U$, has the same number of columns as the rating matrix, $M_R$. The number of columns in the item feature matrix, $M_I$, equals the number of rows in the user feature matrix, $M_U$.

On the client side, the client's rating vector, $V_R$, is the product of the item feature matrix, $M_I$, and the client's user feature vector, $V_U$, such that $V_R = M_I \times V_U$. The client's user feature vector, $V_U$, corresponds to the column in the user feature matrix, $M_U$, on the server corresponding to the user associated with the client.

It is therefore intended that the following appended claims be interpreted as including all such alterations, permutations, and various substitute equivalents as fall within the true spirit and scope of the present invention.

What is claimed is:

1. A method of providing personalized recommendations to anonymous users, comprising:
    at a server,
        factorizing a rating matrix, denoted by $M_R$, into a user feature matrix, denoted by $M_U$, and an item feature matrix, denoted by $M_I$, wherein the rows of $M_R$ correspond to a plurality of users, the columns of $M_R$ correspond to a plurality of items, each of the cells of $M_R$ represents a rating associated with a corresponding item for a corresponding user, and $M_R = M_U \times M_I$, and
        transmitting the item feature matrix, $M_I$, to selected ones of a plurality of client devices associated with the plurality of users; and
    at one of the selected ones of the plurality of client devices associated with one of the plurality of users, calculating a user feature vector, denoted by $V_U$, based on the item feature matrix, $M_I$, and a rating vector, denoted by $V_R$, wherein each of the cells of $V_R$ represents a rating associated with a corresponding one of the plurality of items for the one user, and $V_R = V_U \times M_I$.

2. A method as recited in claim 1, further comprising:
    at the server,
        receiving a plurality of rating vectors anonymously sent from the plurality of client devices; and
        aggregating the plurality of rating vectors into the rating matrix, $M_R$, wherein selected cells of $M_R$ have received ratings from the corresponding users for the corresponding items.

3. A method as recited in claim 2, wherein factorizing the rating matrix, $M_R$, at the server is through approximation.

4. A method as recited in claim 3, wherein factoring the rating matrix, $M_R$, at the server comprises:
    assigning predefined initial values to the cells of the user feature matrix, $M_U$, and the cells of the item feature matrix, $M_I$;
    repeatedly calculating a product matrix, denoted by $M_P$, such that $M_P = M_U \times M_I$, and adjusting values of selected cells of $M_U$ and $M_I$ until a difference between selected corresponding pairs of cells from $M_P$ and $M_R$ is less than a first predefined threshold.

5. A method as recited in claim 1, further comprising:
    at the one client device associated with the one user,
        constructing the rating vector, $V_R$, wherein selected cells of $V_R$ have received ratings from the one user for the corresponding items; and
        anonymously transmitting the rating vector, $V_R$, to the server.

6. A method as recited in claim 5, wherein calculating the user feature vector, $V_U$, at the one client device associated with the one user comprises:
    assigning predefined initial values to the cells of the user feature vector, $V_U$;
    repeatedly calculating a product vector, denoted by $V_P$, such that $V_P = V_U \times M_I$, and adjusting values of selected cells of $V_U$ until a difference between selected corresponding pairs of cells from $V_P$ and $V_R$ is less than a second predefined threshold.

7. A method as recited in claim 1, further comprising:
    at the one client device associated with the one user, recommending selected ones of the plurality of items to the one user based on the item feature matrix, $M_I$, and the user feature vector, $V_U$.

8. A method as recited in claim 7, wherein recommending selected ones of the plurality of items to the one user at the one client device associated with the one user comprises:
    estimating ratings for selected ones of the plurality of items that have not received ratings from the one user based on the item feature matrix, $M_I$, and the user feature vector, $V_U$; and
    recommending the selected ones of the plurality of items to the one user based on their respective estimated ratings.

9. A method as recited in claim 7, wherein recommending selected ones of the plurality of items to the one user at the one client device associated with the one user comprises:
    comparing a first one of the plurality of items that has received a rating from the one user with a second one of the plurality of items that has not received a rating from the one user, wherein the rating for the first one item is greater than or equal to a predefined third threshold; and
    recommending the second one item to the one user if the product of an item feature vector for the first one item, denoted by $V_{I1}$, and an item feature vector for the second on item, denoted by $V_{I2}$, is greater than or equal to a predefined fourth threshold.

10. A method as recited in claim 1, wherein the plurality of items is a plurality pieces of media content.

11. A method as recited in claim 1, further comprising:
    at an anonymizer,
        receiving a rating vector from one of the plurality of client devices; and
        forwarding the rating vector to the server without any identifying information with respect to the one client device and its associated user.

12. A method of obtaining an item feature matrix, denoted by $M_I$, at a server to be used for providing personalized recommendations to anonymous users, comprising:
    aggregating a plurality of rating vectors, denoted by $V_R$, each provided by an anonymous client device, into a rating matrix, denoted by $M_R$, wherein the rows of $M_R$ correspond to a plurality of anonymous users, the columns of $M_R$ correspond to a plurality of items, each of the cells of $M_R$ represents a rating associated with a corresponding item for a corresponding anonymous user, and selected cells of $M_R$ have received ratings from the corresponding anonymous users for the corresponding items;
    factorizing the rating matrix, $M_R$, into a user feature matrix, denoted by $M_U$, and an item feature matrix, denoted by $M_I$, wherein $M_R = M_U \times M_I$; and transmitting the item feature matrix, $M_I$, to selected ones of a plurality of anonymous client devices associated with the plurality of anonymous users.

13. A method as recited in claim 12, wherein factoring the rating matrix, $M_R$, comprises:
assigning predefined initial values to the cells of the user feature matrix, $M_U$, and the cells of the item feature matrix, $M_I$;
repeatedly calculating a product matrix, denoted by $M_P$, such that $M_P = M_U \times M_I$, and adjusting values of selected cells of $M_U$ and $M_I$ until a difference between selected corresponding pairs of cells from $M_P$ and $M_R$ is less than a first predefined threshold.

14. A method as recited in claim 12, further comprises:
sending a rating vector request to the plurality of client devices; and
receiving the plurality of rating vectors from the plurality of client devices.

15. A method as recited in claim 12, further comprises:
resending the rating vector request to the plurality of client devices;
receiving a plurality of updated rating vectors from the plurality of client devices;
aggregating the plurality of updated rating vectors into a second rating matrix;
factorizing the second rating matrix into a second user feature matrix and a second item feature matrix; and
transmitting the second item feature matrix to selected ones of the plurality of anonymous client devices.

16. A method of providing personalized recommendations at a client device while maintaining anonymity of the client device and a user associated with the client device, comprising:
anonymously transmitting a rating vectors, denoted by $V_R$, to a server, wherein each of the cells of $V_R$ represents a rating associated with a corresponding one of a plurality of items for the user, and selected cells of $V_R$ have received ratings from the user for the corresponding items;
receiving an item feature matrix, denoted by $M_I$, from the server;
calculating a user feature vector, denoted by $V_U$, based on the item feature matrix, $M_I$, and the rating vector, $V_R$, wherein $V_R = V_U \times M_I$; and
recommending selected ones of the plurality of items that have not received ratings from the user to the user based on the user feature vector, $V_U$, and the item feature matrix, $M_I$.

17. A method as recited in claim 16, wherein calculating the user feature vector, $V_U$, comprises:
assigning predefined initial values to the cells of the user feature vector, $V_U$;
repeatedly calculating a product vector, denoted by $V_P$, such that $V_P = V_U \times M_I$, and adjusting values of selected cells of $V_U$ until a difference between selected corresponding pairs of cells from $V_P$ and $V_R$ is less than a first predefined threshold.

18. A method as recited in claim 16, wherein recommending selected ones of the plurality of items to the user comprises:
estimating ratings for selected ones of the plurality of items that have not received ratings from the user based on the item feature matrix, $M_I$, and the user feature vector, $V_U$; and
recommending the selected ones of the plurality of items to the user based on their respective estimated ratings.

19. A method as recited in claim 18, wherein recommending selected ones of the plurality of items to the user comprises:
comparing a first one of the plurality of items that has received a rating from the user with a second one of the plurality of items that has not received a rating from the user, wherein the rating for the first one item is greater than or equal to a predefined second threshold; and
recommending the second one item to the user if the product of an item feature vector for the first one item, denoted by $V_{11}$, and an item feature vector for the second on item, denoted by $V_{12}$, is greater than or equal to a predefined third threshold.

20. A method as recited in claim 16, further comprising:
constructing the rating vector, $V_R$.

21. A method as recited in claim 20, wherein the rating vector, $V_R$, is constructed automatically based on usage information of the client device.

22. A method as recited in claim 16, further comprising:
constructing an updated rating vector; and
anonymously transmitting the updated rating vectors to the server.

23. A system for providing personalized recommendations to anonymous users, comprising:
a server arranged to factorize a rating matrix, denoted by $M_R$, into a user feature matrix, denoted by $M_U$, and an item feature matrix, denoted by $M_I$, wherein the rows of $M_R$ correspond to a plurality of users, the columns of $M_R$ correspond to a plurality of items, each of the cells of $M_R$ represents a rating associated with a corresponding item for a corresponding user, and $M_R = M_U \times M_I$, and transmit the item feature matrix, $M_I$, to selected ones of a plurality of client devices associated with the plurality of users;
an anonymizer arranged to relay communications between the server and the selected ones of the plurality of client devices so that the plurality of client devices and their associated users remain anonymous to the server; and
one of the plurality of client devices arranged to calculate a user feature vector, denoted by $V_U$, based on the item feature matrix, $M_I$, and a rating vector, denoted by $V_R$, wherein each of the cells of $V_R$ represents a rating associated with a corresponding one of the plurality of items for the one user, and $V_R = V_U \times M_I$.

24. A system as recited in claim 23, wherein factorize the rating matrix, $M_R$, at the server is through approximation.

25. A system as recited in claim 24, wherein factorize the rating matrix, $M_R$, at the server comprises:
assign predefined initial values to the cells of the user feature matrix, $M_U$, and the cells of the item feature matrix, $M_I$;
repeatedly calculate a product matrix, denoted by $M_P$, such that $M_P = M_U \times M_I$, and adjusting values of selected cells of $M_U$ and $M_I$ until a difference between selected corresponding pairs of cells from $M_P$ and $M_R$ is less than a first predefined threshold.

26. A system as recited in claim 23, wherein the server is further arranged to receive a plurality of rating vectors anonymously sent from the plurality of client devices; and aggregate the plurality of rating vectors into the rating matrix, $M_R$, wherein selected cells of $M_R$ have received ratings from the corresponding users for the corresponding items.

27. A system as recited in claim 23, wherein the one client device is further arranged to construct the rating vector, $V_R$, wherein selected cells of $V_R$ have received ratings from a user associated with the one client device for the corresponding items; and anonymously transmit the rating vector, $V_R$, to the server.

28. A system as recited in claim 23, wherein calculate the user feature vector, $V_U$, at the one client device comprises:
   assign predefined initial values to the cells of the user feature vector, $V_U$;
   repeatedly calculate a product vector, denoted by $V_P$, such that $V_P=V_U \times M_I$, and adjusting values of selected cells of $V_U$ until a difference between selected corresponding pairs of cells from $V_P$ and $V_R$ is less than a second predefined threshold.

29. A system as recited in claim 23, wherein the one client device is further arranged to recommend selected ones of the plurality of items to a user associated with the one client device based on the item feature matrix, $M_I$, and the user feature vector, $V_U$.

30. A method as recited in claim 29, wherein recommend selected ones of the plurality of items to the user at the one client device comprises:
   estimate ratings for selected ones of the plurality of items that have not received ratings from the one user based on the item feature matrix, $M_I$, and the user feature vector, $V_U$; and
   recommend the selected ones of the plurality of items to the user based on their respective estimated ratings.

31. A computer program product for providing personalized recommendations to anonymous users, the computer program product comprising a computer-readable medium having a plurality of computer program instructions stored therein, which are operable to cause at least one computing device to:
   at a server,
      factorize a rating matrix, denoted by $M_R$, into a user feature matrix, denoted by $M_U$, and an item feature matrix, denoted by $M_I$, wherein the rows of $M_R$ correspond to a plurality of users, the columns of $M_R$ correspond to a plurality of items, each of the cells of $M_R$ represents a rating associated with a corresponding item for a corresponding user, and $M_R=M_U \times M_I$; and
      transmit the item feature matrix, $M_I$, to selected ones of a plurality of client devices associated with the plurality of users; and
   at one of the selected ones of the plurality of client devices associated with one of the plurality of users, calculate a user feature vector, denoted by $V_U$, based on the item feature matrix, $M_I$, and a rating vector, denoted by $V_R$, wherein each of the cells of $V_R$ represents a rating associated with a corresponding one of the plurality of items for the one user, and $V_R=V_U \times M_I$.

32. A computer program product as recited in claim 31, wherein the plurality of computer program instructions are further operable to cause the at least one computing device to:
   at the server,
      receive a plurality of rating vectors anonymously sent from the plurality of client devices; and
      aggregate the plurality of rating vectors into the rating matrix, $M_R$, wherein selected cells of $M_R$ have received ratings from the corresponding users for the corresponding items.

33. A computer program product as recited in claim 32, wherein factorize the rating matrix, $M_R$, at the server is through approximation.

34. A computer program product as recited in claim 33, wherein factoring the rating matrix, $M_R$, at the server comprises:
   assign predefined initial values to the cells of the user feature matrix, $M_U$, and the cells of the item feature matrix, $M_I$;
   repeatedly calculate a product matrix, denoted by $M_P$, such that $M_P=M_U \times M_I$, and adjusting values of selected cells of $M_U$ and $M_I$ until a difference between selected corresponding pairs of cells from $M_P$ and $M_R$ is less than a first predefined threshold.

35. A computer program product as recited in claim 31, wherein the plurality of computer program instructions are further operable to cause the at least one computing device to:
   at the one client device associated with the one user,
      construct the rating vector, $V_R$, wherein selected cells of $V_R$ have received ratings from the one user for the corresponding items; and
      anonymously transmit the rating vector, $V_R$, to the server.

36. A computer program product as recited in claim 35, wherein calculate the user feature vector, $V_U$, at the one client device associated with the one user comprises:
   assign predefined initial values to the cells of the user feature vector, $V_U$;
   repeatedly calculate a product vector, denoted by $V_P$, such that $V_P=V_U \times M_I$, and adjusting values of selected cells of $V_U$ until a difference between selected corresponding pairs of cells from $V_P$ and $V_R$ is less than a second predefined threshold.

37. A computer program product as recited in claim 31, wherein the plurality of computer program instructions are further operable to cause the at least one computing device to:
   at the one client device associated with the one user, recommend selected ones of the plurality of items to the one user based on the item feature matrix, $M_I$, and the user feature vector, $V_U$.

38. A computer program product as recited in claim 37, wherein recommend selected ones of the plurality of items to the one user at the one client device associated with the one user comprises:
   estimate ratings for selected ones of the plurality of items that have not received ratings from the one user based on the item feature matrix, $M_I$, and the user feature vector, $V_U$; and
   recommend the selected ones of the plurality of items to the one user based on their respective estimated ratings.

39. A computer program product as recited in claim 31, wherein the plurality of computer program instructions are further operable to cause the at least one computing device to:
   at an anonymizer,
      receive a rating vector from one of the plurality of client devices; and
      forward the rating vector to the server without any identifying information with respect to the one client device and its associated user.

* * * * *